Patented Sept. 22, 1936

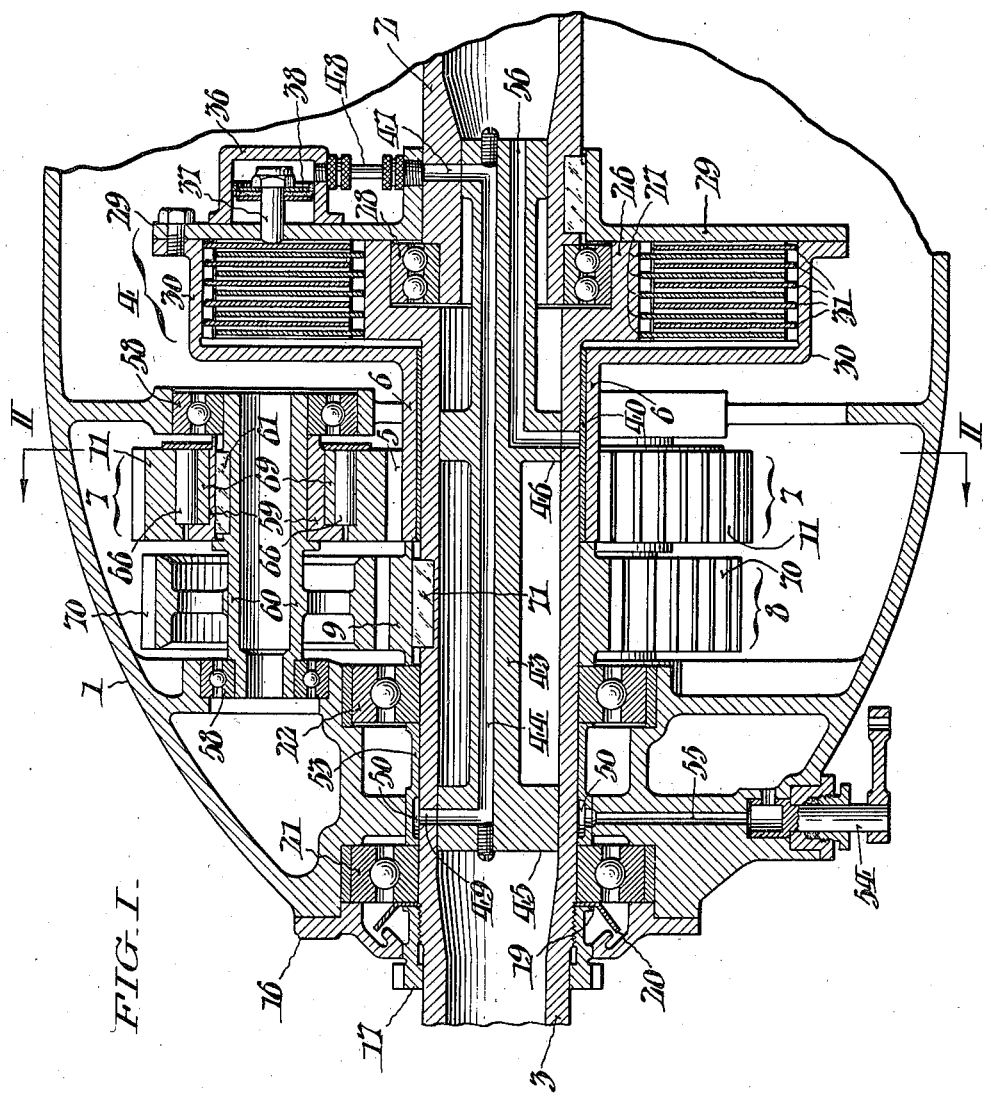
FIG. I.

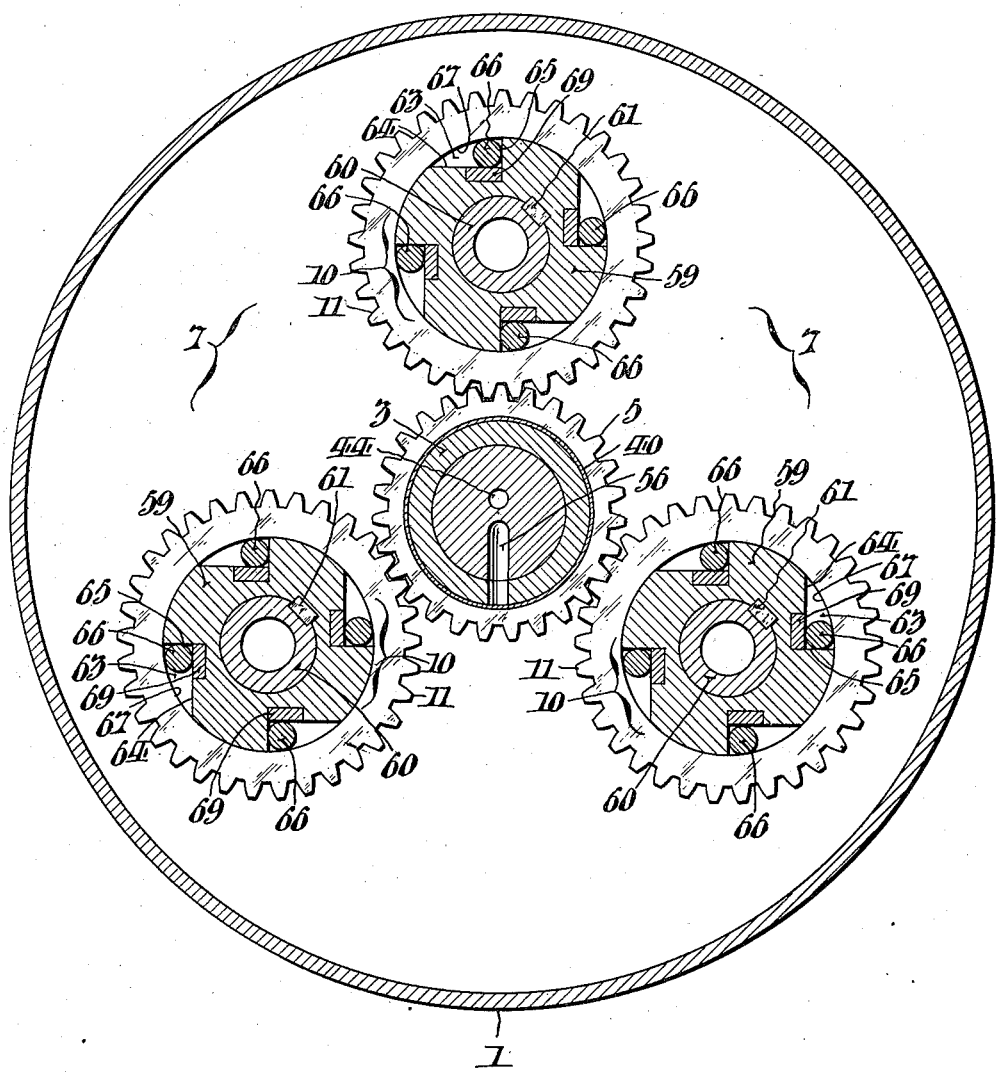

2,055,081

UNITED STATES PATENT OFFICE 2,055,081

AIRCRAFT PROPELLING MECHANISM

Albert R. Jacobs, Reiffton, Pa.

Application April 16, 1935, Serial No. 16,655

1 Claim. (Cl. 74—364)

This invention, while relating generally to improvements in aircraft propelling mechanism, is more particularly related to constant torque multiple speed transmission gears for aircraft, which provide a drive connection between the power shaft and the propeller shaft.

The development in aircraft has so increased the top speed of the craft that the pitch of the propeller has had to be increased to such an extent that it is difficult to obtain sufficient revolutions of the engine in take-off and climb without some means of either varying that pitch at will or being able to change the ratio between the speed of the engine and the speed of the propeller. This invention solves the problem in the latter manner by providing a constant torque transmission which permits a gear reduction between the engine and propeller for take-off and climb; and without disconnecting the engine from the propeller or reducing the torque it is possible to change to a direct drive between the engine and the propeller. In previous multiple speed transmissions for aircraft, one of the difficulties lay in the momentary freeing of the propeller from the pull of the engine during the change of gears. By providing a constant torque transmission in which there is no freeing of the propeller as gears are changed, this invention has overcome one problem long standing in the road of the development of the aeroplane.

Another advantage of this engine lies in the ability of the pilot to permit the propeller to run free from an engine which has failed in a multi-motored aeroplane and thus reduce the drag of that engine.

Other objects and advantages of the invention will be apparent from the detailed description of a preferred embodiment thereof which follows and which has reference to the accompanying drawings.

Of the drawings:

Fig. I represents a longitudinal section of the constant torque multiple speed transmission embodying this invention, as installed in the forward end of an aeroplane.

Fig. II represents a cross-section of the apparatus, taken about the lines II—II of Fig. I.

In Fig. I the apparatus embodying my invention is shown housed in a casing 1 and comprises generally a power shaft 2, a propeller shaft 3, both of which are hollow, a conventional clutch 4 of the friction disc type joining the two shafts 2 and 3, a driving gear 5 formed integrally on a sleeve 6 extended from the clutch 4, a set of cluster gears 7 meshing with the driving gear 5 (see Fig. II), a second set of cluster gears 8 axially connected to said first set of gears 7, gear by gear, a driven gear 9 keyed to the propeller shaft 3 and in mesh with the set of gears 8, and finally an over-riding clutch mechanism 10 fitted into each gear 11 of the set of gears 7.

The casing 1, of a conventional type having a number of integral extensions inward to support parts of the mechanism, has a cover-plate 16 over the tapered end nearest the propeller. The cover-plate 16 is bolted to the casing 1 and cooperates in protecting the mechanism in the casing 1 from dirt, with a retaining sleeve 17 threaded onto the propeller shaft 3 and drawn up tight against a locking ring 19. The locking ring 19 has an apron 20 which is bent outward to cooperate with the plate 16 and sleeve 17 in excluding dirt and foreign matter from the casing 1.

The propeller shaft 3 is supported by the ball-bearings 21 and 22, which are of a conventional type and are supported by an extension of the inside of the casing 1. The outer end of the propeller shaft 3 carries the propeller (not shown) and the inner end is formed into a drum 26 on which are mounted clutch plates 27.

The inner end of the power shaft 2 is supported within the drum 26 by a bearing 28 of a conventional type. Secured integrally to the shaft 2 at this end is a face plate 29 to which is bolted a clutch casing 30 having mounted within a set of clutch plates 31 which cooperate as shown with the other clutch plates 27. Mounted on the face plate 29 are the usual piston chambers 36 with pistons 38 to which pressure is applied in actuating the clutch mechanism. Pressure on a piston head 38 drives a piston rod 37 inward, compressing the two sets of clutch plates 27 and 31 into frictional engagement, causing the shafts 2 and 3 to rotate integrally. The forward end of the clutch casing 30 is formed into the sleeve 6 and fitted with a bearing 40 to receive a portion of the propeller shaft 3 as a journal. Within the two shafts 2 and 3 is fitted a core 43 having a bore or pressure line 44 running longitudinally therethrough. This core 43 secured to the power shaft 2 revolves freely within the propeller shaft 3 on journals formed at 45 and 46. One end of the pressure line 44 is connected to the piston chamber 36 through an opening 47 in the shaft 2 and the pipe 48. The other end of the pressure line 44 is connected to the source of pressure supply through the opening 49 in the shaft 3, and annular cavity 50 in a bearing 53 which is connected to a control valve 54 by a pressure line 55 bored in the casing 1. The pressure supply which is not shown is connected to the control valve 54. A bore or passage 56 in the core 43 is used to supply oil to the bearing 40 as in the usual types of lubricating systems.

The first set of cluster gears comprises three gears 11 journaled in ball-bearings 58 supported in extensions of the casing 1. The gears 11 all mesh with the driving gear 5 which is smaller than the gears 11, as clearly appears in Fig. II of the drawings. The ratio between these gears 11 and 5 reduces the speed the desired amount. Each of these three gears 11 has an inner wheel 59 on which the gear 11 can revolve, the inner wheel 59 being keyed to a shaft 60 by a key 61. In the periphery of each inner wheel 59 are four recesses 63 having wedging faces 64 and non-wedging faces 65, at right angles thereto. The size and shape of the recesses 63 and the relationship of the wedging faces 64 and non-wedging faces 65 are such that a wedging element or wedging roller 66 inserted in the space between the inner wheel 59 and the gear 11 formed by the recess 63 will bind the inner wheel 59 to the gear 11 when the roller 66 is forced to one end of the recess 63 and allow the gear 11 to revolve freely on the inner wheel 59 when the roller 66 is forced to the other end of the recess 63. For these purposes, a non-wedging face 65 is also provided to prevent any wedging of the roller 66 when urged against the face 65 and to allow the roller 66 to revolve as a roller bearing. The non-wedging face 65 extends perpendicularly to a tangent at the point where the non-wedging face 65 joins the periphery of the inner wheel 59, but this angle may be varied so long as it is sufficiently obtuse that wedging action is avoided. By the same reasoning the wedging face 64 must depart considerably from a line perpendicular to a tangent drawn to the point where the wedging face 64 joins the periphery of the inner wheel 59.

Considering the important characteristics of the recesses 63 from another viewpoint, the non-wedging face must make a sufficiently obtuse angle with the segment 67 of the arc formed by the inner surface of gear 11 as spanned by the recess 63, that the roller 66 will not wedge and bind the gear 11 to the inner wheel 59. The wedging face 64 must make a sufficiently acute angle with this same segment of arc that the roller 66 will be wedged between the gear 11 and inner wheel 59 binding them integrally.

As the rollers 66 are to rotate, as in roller bearings, when the gear 11 and inner wheel 59 are free, the bearing pieces 69 are inset into the surface of the wedging faces 64 to take this wear and are of a metal appropriate to their function.

Formed integrally on the shafts 60 are gears 70 comprising the second set of cluster gears 8 and all meshing with the driven gear 9 which is keyed to the propeller shaft 3 by the key 71. These gears 70 and 9 are of 1:1 ratio, the reduction taking place in the ratio of gears 11 to driving gear 5. Of course, the reduction in speed by varying the various ratios has many possibilities well understood in the art.

In describing the operation of this invention, it will first be assumed that the aeroplane is on the ground preparing to take off. The slow speed through the reduction gear is being used, and the clutch is released. The propeller is then driven through the reduction gears in the following manner. The sleeve 6 being integrally secured to the power shaft through the clutch casing 30 and the face plate 29, revolves with the power shaft 2. The driving gear 5 formed integrally with sleeve 6, drives the gears 11 comprising the first set of cluster gears 7. The gears 11 urge the rollers 66 into the acute angle formed by the wedging faces 64 and the subtended arcuate segments 67 of the inner surfaces of said gears 11 thereby wedging each inner wheel 59 and its corresponding gear 11 to rotate as one. As the gears 11 are larger than the driving gear 5, the reduction in speed is accomplished by this gear ratio. The gears 11 revolving integrally with inner wheels 59 now cause the rotation of the gears 70 which are formed integrally with the shafts 60 to which the inner wheels 59 are keyed. This second set of cluster gears 8 drives the propeller shaft 3 at the already reduced speed through meshing with the driven gear 9 which is of the same size as the gears 70. The engine is thus driving the propeller at a reduced speed through the reduction gear described.

After the aeroplane has left the ground a higher speed is desired and this is obtained by putting pressure on the clutch by operating the valve 54 which causes the pistons 36 to press the interacting clutch plates 27 and 31 into frictional engagement. The power shaft 2 and the propeller shaft 3 are now bound together and turning as one shaft thus connecting the propeller directly to the engine. The effect of this on the reduction gear train is that the second set of cluster gears 8 are now driven faster than the first set 7 and these two sets of gears 7 and 8 must be freed from each other. This is accomplished through the overriding clutch mechanism 10 fitted to the first set of cluster gears 7. The inner wheels 59 now turn faster than the gears 11 and the wedge rollers 66 are rolled to the larger ends of the recesses and into contact with the non-wedging faces 65 and bearing pieces 69 where these rollers 66 function as roller bearings and allow the gears 11 to turn on the inner wheels 59. The aeroplane is now running with propeller directly connected to motor and hence with an increased speed limit.

It is noted that the propeller speed was thus changed without freeing the engine and propeller from each other and there was a constant torque at all times through the transmission drive. One speed simply merges into the other without any interim freedom of propeller from engine. The advantages and benefits seem clear in thus eliminating the usual interim of disconnection of motor and propeller during changes of speed. The aeroplane is always driven by either one or the other speeds and there is no question of falling between the two and permitting the engine to race without load. Further, the mechanism by which these benefits are obtained is characterized by its mechanical simplicity, ease of operation and the absence of easily worn or breakable parts.

While my invention has been described in some detail with reference to a specific embodiment, various changes in the form of apparatus used are within the contemplation of the invention and such changes should not be deemed to constitute a departure from the spirit of the invention as hereinafter claimed.

Having thus described my invention, I claim:

A constant torque multiple speed transmission for aircrafts, comprising a casing with shaft supporting bearing, a hollow power shaft, a hollow propeller shaft, a clutch casing keyed to the driving shaft having clutch plates mounted on the inside thereof, a second set of clutch plates mounted on the driven shaft, the plates of one set extending between the plates of the other set, a reduction gear connecting said clutch casing with said driven shaft, one of said gears having an overriding clutch mechanism automatically disengaging said gear from its shaft, when said clutch is engaged, pressure means for actuating said clutch, a core integrally secured within said power shaft and having journals for riding on the inner surface of said propeller shaft, an annular cavity formed in the shaft supporting bearing in line with one of said core journals and connected to a pressure source through a control valve, and a pressure line in said core connecting said annular cavity to said pressure means for actuating said clutch.

ALBERT R. JACOBS.